April 8, 1958  A. A. BURGESS, JR  2,830,156
SHOCK AND VIBRATION RESISTANT FUSE
Filed Dec. 21, 1956

INVENTOR.
A. A. BURGESS JR.
BY
ATTYS

United States Patent Office 2,830,156
Patented Apr. 8, 1958

2,830,156

SHOCK AND VIBRATION RESISTANT FUSE

Arthur A. Burgess, Jr., Silver Spring, Md., assignor to the United States of America as represented by the Secretary of the Navy Application December 21, 1956, Serial No. 630,009

7 Claims. (Cl. 200—131)

(Granted under Title 35, U. S. Code (1952), sec. 266)

The invention described herein may be manufactured and used by or for the Government of the United States of America for governmental purposes without the payment of any royalties thereon or therefor.

The present invention relates to a safety fuse for use in electrical circuits and more particularly to a safety fuse comprising a fusible wire link imbedded in a cured potting compound or material for the purpose of supporting the wire link during operation under high shock and severe vibrational conditions.

In the design and development of modern day electronic equipment which must operate in an environment including severe shock and vibrational conditions, there is a requirement for a reliable safety fuse which must not only withstand such environmental conditions without breaking its electrical continuity but, once burned out, must maintain a high open circuit resistance greater than $10^6$ ohms during the aforesaid conditions. The magnitude of the shock that the fuse must withstand is 5000 g. and the maximum vibrational condition which the fuse must withstand is a sinusoidal function having a frequency of 50 cycles per second and a peak amplitude of 20 g.

Prior art electrical safety fuses fail to satisfy the exacting requirements.

It is therefore a primary object of the present invention to provide a reliable safety fuse which can operate under severe shock and vibrational conditions.

Another object is the provision of an electrical safety fuse in which the fuse link is mechanically supported and can withstand shock forces as high as 5000 g. and a vibrational condition of the order of a sinusoidal function having a frequency of 50 cycles per second and a peak amplitude of 20 g., without the electrical continuity of the fuse link being broken.

A further object is to provide a reliable safety fuse which can operate in conditions of severe shock and vibration but when burned out will maintain a high open circuit resistance greater than $10^6$ ohms during such conditions.

Still another object is the provision of a body of material encasing the fuse link to support and protect the fuse link against severe shock and vibration, the material being composed of a potting compound.

A still further object is to provide a safety fuse having a fuse link of fine wire helically wound on a support of insulating material.

A final object of the invention is the provision of a safety fuse in which a fine wire fuse link is supported on an insulator and the link and insulator are imbedded in a cured potting compound.

The exact nature of this invention as well as other objects and advantages thereof will be readily apparent from consideration of the following specification relating to the annexed drawing in which.

Figure 1:
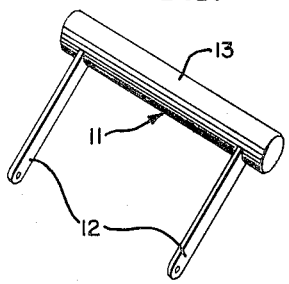
Fig. 1 is a perspective view on which is shown a typical embodiment of the safety fuse of this invention.
Figure 2:
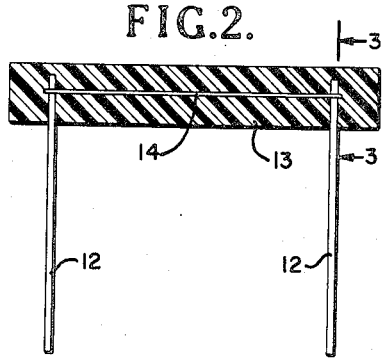
Fig. 2 is an enlarged sectional side view, partly in section, of the safety fuse of Fig. 1.
Figure 3:
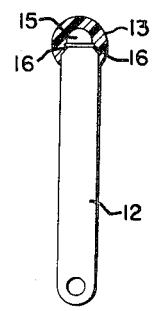
Fig. 3 is a sectional view along line 3—3 of Fig. 2.

Referring now to the drawing, wherein like reference characters designate like or corresponding parts throughout the several views, there is shown in Fig. 1 a safety fuse embodying a typical form of the present invention and designated generally by reference numeral 11. The safety fuse comprises a pair of spaced-apart tab terminals 12 and a dielectric body 13 encasing a fusible wire or fuse link 14, Fig. 2.

Each terminal 12 is formed with a reduced end 15 and notched sides 16, the ends of the wire link 14 being looped around the reduced ends and secured thereto by soldering, or the like. The wire link is disposed between the reduced ends substantially centrally thereof, the wire link and reduced ends being imbedded in body 13, which body, in accordance with the invention, is composed of a cured potting compound of epoxy resin. An epoxy type resin compound, when cured, constitutes a dielectric material which when heated by the melting of a fuse link imbedded therein, heats to a flow state adjacent the link and due to confined heating therein, a high internal pressure is created which causes cavitation about the link.

The fusible wire or fuse link 14 may be a wire of any suitable material, such as copper, silver, gold, platinum, aluminum, etc., or alloys, and of proper fineness; copper wire approximately twenty-five ten thousandths [0.0025] of an inch in diameter having been successfully used. Also, the body 13 may be contoured to any desired shape, such as rectangular, square, cylindrical, etc.; the configuration of safety fuse shown in Fig. 1 merely being typical. The potting compound, in its cured state, serves as a mechanical support for the fusible wire and protects the wire from severe shock forces as high as 5000 g. and a vibrational condition of the order of a sinusoidal function having a frequency of 50 cycles per second and a peak amplitude of 20 g.

Figure 4:
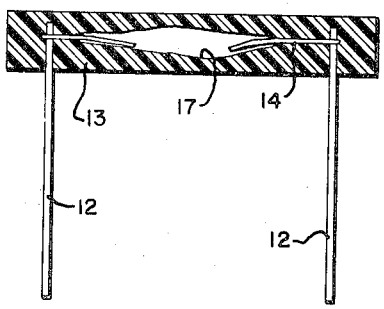
Fig. 4 is a view similar to Fig. 2 schematically showing the condition of the safety fuse after burn-out.

In the operation of the safety fuse thus far described, when the fusible wire or fuse link 14 is subjected to a current pulse or flow above its nominal current rating, the link begins to heat and soon reaches a molten state. Heat from the molten link heats the surrounding potting compound to a flow state and a high internal pressure is created therein due to confined heating of the potting compound which causes a cavity 17 to form therein around the link. Formation of the cavity removes the support for the molten link and the link collapses and breaks, thereby providing electrical discontinuity. Immediately thereafter, the broken link begins cooling and contracts, the contraction causing increased separation of the broken ends thereof and establishing a high open circuit resistance greater than $10^6$ ohms measured at 300 volts D. C. The operation may be better appreciated by reference to Fig. 4 which is a schematic showing of the fuse after burn-out.

In an actual test, a fuse having a fusible link of No. 43 AWG copper wire and a resistance of 0.166 ohm, was subjected to a current pulse of about seven amperes D. C.

The open circuit resistance, after burn-out, was 1.5 ×10¹² ohms measured at 300 volts D. C.

Figure 7:
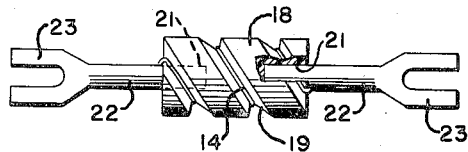
Fig. 7 is an enlarged detail view, partly in section, of the fusible wire link supporting means shown in Fig. 5.
Figure 5:
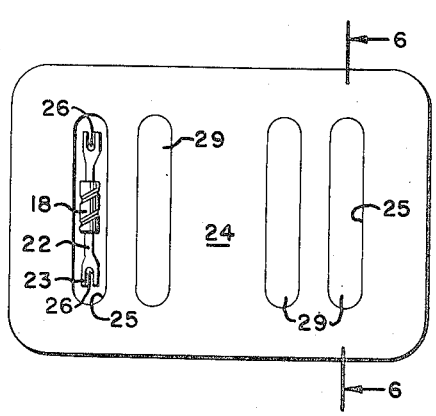
Fig. 5 is a plan view of a fuse box incorporating another embodiment of the safety fuse of this invention, the potting compound around one fusible wire link being omitted in order to show the form of the means supporting the wire link.
Figure 6:
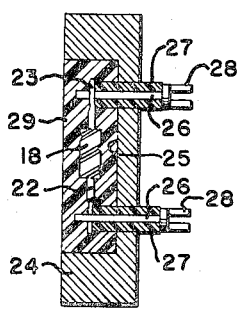
Fig. 6 is a view, in section, along line 6—6 of Fig. 5.

Figs. 5, 6 and 7 relate to another embodiment of the safety fuse of this invention in which the fusible wire or fuse link 14 is supported in a novel manner. In this embodiment, the wire 14 is wound about a support 18, the support being substantially cylindrical and formed with a helical groove 19 in the outer peripheral surface thereof, in which groove the wire is received; see Fig. 7. The support is composed of any suitable insulating material; for example, the resin, tetrafluoroethylene, also known as Teflon, has been successfully used.

Extending inwardly part way from the ends of support 18, on the central axis thereof, are a pair of wells or bores 21. Received in each of the wells or bores is an end of a rod or connector 22, the adjacent end of the wire 14 being secured thereto, as by soldering, or the like. If desired, the outer end of each connector may be forked as at 23 to facilitate an external electrical connection thereto.

In Fig. 5, reference numeral 24 designates a fuse box, the box 24 being formed with a plurality of elongated cavities 25, each of which is adapted to contain a fuse link unit like that shown in Fig. 7 and hereinbefore described. The box is provided with a plurality of terminals 26, a pair to each cavity, each terminal being insulated from the box by means of an insulating tube or sleeve 27 which may be ceramic, plastic, etc.

As will be understood from an inspection of Fig. 6, each pair of tubes or sleeves 27 is mounted in box 24 so as to be disposed in spaced relation in a cavity 25 and the terminal 26 in each tube or sleeve extends therebeyond into the cavity. The external end of each terminal is provided with a suitable contact 28, which may be forked, if desired.

The internal end of each terminal 26 is adapted to be received in the forked end 23 of connector 22 of the fuse link unit shown in Fig. 7, it being understood, of course, that the spacing of the terminals and of the forked ends of the connectors is such as to accomplish such reception easily. The fuse link unit is disposed so that the forked ends of the connectors rest on the respective tubes or sleeves 27 and the respective terminals are received in the forked ends; see Figs. 5 and 6. Each forked end 23 is secured to its terminal, as by soldering, or the like.

After the terminals and fuse link unit of each cavity 25 have been assembled and secured, the cavities are potted with a suitable potting compound, such as an epoxy type resin, or the like. After curing, the potting compound forms a body 29 encasing the fuse link unit, with said unit imbedded therein.

The operation of the fuse embodied in Figs. 5 and 6 is substantially the same as the operation of the fuse of Figs. 1–4. Briefly, overload current causes heating of the fusible wire link 14 to a molten state and cavitation of the material of body 29; particularly, at the line of contact of the link and the material. The molten link collapses and breaks to interrupt the flow of current, and after cooling has a high open circuit resistance.

Various modifications are contemplated and may obviously be resorted to by those skilled in the art without departing from the spirit and the scope of the invention, as only preferred embodiments thereof have been disclosed.

What is claimed as new and desired to be secured by Letters Patent of the United States is:

1. A shock and vibration resistant safety fuse for use in electrical circuits, said fuse comprising a fusible link, and means including dielectric material rigidly supporting said link, said link being imbedded in said material to enable the link to withstand severe shock and vibrational conditions and maintain a conduction path through the link during operation under said conditions, said link being composed of matter that becomes molten upon passage of an overload current pulse therethrough, and said material being an epoxy type resin that is heated to a flow state by the molten link and forms a cavity next to the link due to a high internal pressure created because of confined heating of the material, said molten link collapsing into said cavity, whereby said link separates and the conduction path is broken, and whereby the separated link cools and contracts to establish a high open circuit resistance, said means serving to support said link in separated condition and to maintain said high open circuit resistance under the aforesaid shock and vibrational conditions.

2. A fuse as claimed in claim 1, in which the fusible link comprises a metallic wire approximately twenty-five ten thousandths of an inch in diameter.

3. A fuse as claimed in claim 2, further characterized in that the magnitude of the shock condition withstandable by said fuse is 5000 g. and the vibrational condition withstandable thereby is a sinusoidal function having a frequency of fifty cycles per second and a peak amplitude of 20 g.

4. A safety fuse for use in electrical circuits, said fuse comprising a pair of spaced-apart terminals, each of said terminals having a reduced end-portion, a fusible wire link, one end of said link being looped about and secured to the reduced end-portion of one of said terminals, the other end of said link being looped about and secured to the reduced end-portion of the other of said terminals, and a rigid body of cured epoxy type resin encasing said end portions and said link for rigidly supporting said link for operation under severe shock and vibrational conditions.

5. A safety fuse for use in electrical circuits, said fuse comprising an elongated member, said member being formed with a groove extending from one end to the other of the member, a connector extending from one end of said member, another connector extending from the other end of said member, a fusible link disposed in said groove and having end-portions extending beyond the ends of said member, said end-portions of the link being secured to said connectors respectively, a pair of terminals, said connectors being connected to said terminals respectively, and a body of cured epoxy type resin, said member and fusible link being imbedded in said body.

6. A fuse as recited in claim 5, wherein said member is substantially cylindrical and the groove is helical.

7. A fuse as recited in claim 5, wherein said fusible link is a metallic wire having a diameter of approximately twenty-five ten thousandths of an inch.

References Cited in the file of this patent

UNITED STATES PATENTS

| Number | Name | Date |
|---|---|---|
| 377,073 | Hibbard | July 31, 1888 |
| 1,288,724 | Snelling | Dec. 24, 1918 |
| 1,862,317 | Ringwald | June 7, 1932 |
| 1,927,905 | Slepian et al. | Sept. 26, 1933 |
| 2,018,556 | Hope | Oct. 22, 1935 |
| 2,302,820 | Van Liempt | Nov. 22, 1942 |
| 2,483,577 | Fahnoe | Oct. 4, 1949 |